United States Patent
Shimizu et al.

(10) Patent No.: US 10,086,825 B2
(45) Date of Patent: Oct. 2, 2018

(54) TRAVEL DRIVING APPARATUS OF VEHICLE

(71) Applicant: MITSUBISHI JIDOSHA KOGYO KABUSHIKI KAISHA, Tokyo (JP)

(72) Inventors: Ryo Shimizu, Tokyo (JP); Norihiko Ikoma, Tokyo (JP); Makoto Kamachi, Tokyo (JP); Hironori Abe, Tokyo (JP); Naoki Miyamoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/464,478

(22) Filed: Mar. 21, 2017

(65) Prior Publication Data

US 2017/0282898 A1 Oct. 5, 2017

(30) Foreign Application Priority Data

Mar. 30, 2016 (JP) .................... 2016-068412

(51) Int. Cl.
*B60K 6/46* (2007.10)
*B60W 10/30* (2006.01)
(Continued)

(52) U.S. Cl.
CPC ............. *B60W 20/14* (2016.01); *B60K 6/26* (2013.01); *B60K 6/387* (2013.01); *B60K 6/442* (2013.01); *B60L 7/16* (2013.01); *B60L 7/18* (2013.01); *B60L 11/14* (2013.01); *B60L 11/1814* (2013.01); *B60L 11/1861* (2013.01); *B60L 15/2009* (2013.01); *B60T 1/10* (2013.01); *B60W 30/18127* (2013.01); *B60L 2210/00* (2013.01);
(Continued)

(58) Field of Classification Search
CPC ...... B60L 11/1861; B60L 3/0015; B60K 6/46; B60K 6/445; B60K 6/44; B60W 10/30; H02J 7/0091
See application file for complete search history.

(56) References Cited

U.S. PATENT DOCUMENTS 6,232,729 B1    5/2001   Inoue
6,362,535 B1 *  3/2002   Tilyou ................ B60K 6/46
                                              290/40 C
(Continued)

FOREIGN PATENT DOCUMENTS

EP    2896543 A1    7/2015
EP    2990288 A1    3/2016
JP    2007-325352 A  12/2007

*Primary Examiner* — Yuri Kan
(74) *Attorney, Agent, or Firm* — Birch, Stewart, Kolasch & Birch, LLP (57) ABSTRACT

In a hybrid vehicle including: a step-up converter for stepping-up the voltage from a battery and supplying power to the front motor for driving front wheels; as well as a paddle switch for setting regenerative braking torque stepwisely, and a hybrid control unit for calculating a regenerative braking force based on a selection stage set by the paddle switch, the hybrid control unit decreases the regenerative braking force to be less than the regenerative braking force while the maximum input/output power of the step-up converter is not limited, when a selection stage in which regenerative braking force is more than that in a D range is selected while the maximum input/output power of the step-up converter is limited.

14 Claims, 4 Drawing Sheets

(51) Int. Cl.

| | | |
|---|---|---|
| *B60K 6/445* | (2007.10) | |
| *B60K 6/44* | (2007.10) | |
| *B60W 20/14* | (2016.01) | |
| *B60K 6/26* | (2007.10) | |
| *B60K 6/387* | (2007.10) | |
| *B60K 6/442* | (2007.10) | |
| *B60L 7/18* | (2006.01) | |
| *B60L 11/14* | (2006.01) | |
| *B60L 11/18* | (2006.01) | |
| *B60T 1/10* | (2006.01) | |
| *B60L 7/16* | (2006.01) | |
| *B60L 15/20* | (2006.01) | |
| *B60W 30/18* | (2012.01) | |

(52) U.S. Cl.
CPC ... *B60L 2240/423* (2013.01); *B60L 2240/443* (2013.01); *B60L 2240/507* (2013.01); *B60L 2240/525* (2013.01); *B60L 2250/24* (2013.01); *B60L 2260/30* (2013.01); *B60T 2270/60* (2013.01); *B60W 2710/0666* (2013.01); *B60W 2710/0677* (2013.01); *B60W 2710/083* (2013.01); *B60W 2710/244* (2013.01); *B60Y 2300/18125* (2013.01); *B60Y 2300/91* (2013.01); *B60Y 2400/112* (2013.01); *B60Y 2400/61* (2013.01); *B60Y 2400/90* (2013.01); *Y02T 10/645* (2013.01); *Y02T 10/72* (2013.01); *Y02T 10/7275* (2013.01); *Y10S 903/93* (2013.01)

(56) References Cited

U.S. PATENT DOCUMENTS

| | | | |
|---|---|---|---|
| 2004/0070270 A1* | 4/2004 | Gunji | B60K 6/44 303/152 |
| 2009/0173555 A1* | 7/2009 | Okamura | B60K 6/46 180/65.22 |
| 2011/0260667 A1 | 10/2011 | Ramamurthy et al. | |
| 2012/0304622 A1* | 12/2012 | Verbrugge | B60W 10/30 60/274 |
| 2015/0069938 A1 | 3/2015 | Hisano | |
| 2015/0081147 A1 | 3/2015 | Kawaguchi | |
| 2016/0114788 A1* | 4/2016 | Kamatani | B60K 6/445 701/22 |
| 2016/0167519 A1* | 6/2016 | Luke | B60L 3/0015 701/22 |
| 2016/0257293 A1* | 9/2016 | Takahashi | H02J 7/0091 |

* cited by examiner

TRAVEL DRIVING APPARATUS OF VEHICLE

BACKGROUND OF THE INVENTION

Field of the Invention

Figure 3:
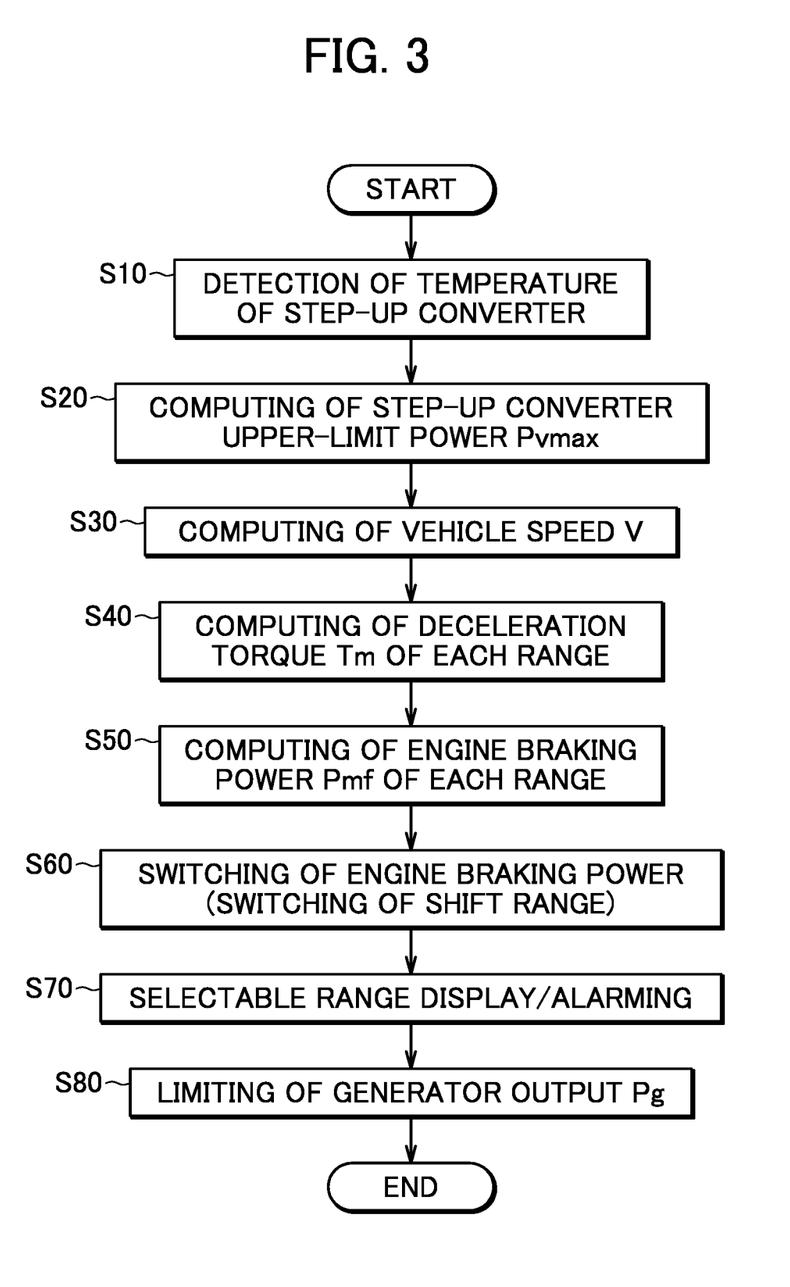
FIG. 3 is a flowchart to show the driving control procedure in the travel driving apparatus of the present embodiment.

In step S40, a deceleration torque Tm of each shift range selected by the paddle switch 31 is computed. The deceleration torque Tm is a braking torque during regenerative braking, which is preset in each shift range. Note that in the present embodiment, deceleration torques Tm (Tm3 to Tm5) of B3 range or higher (B3 to B5) are limited according to a temperature condition of the step-up converter. The deceleration torque Tm is set so as to be small in B0 range and largest in B5 range within an extent from B0 range to B5 range. Then, the process proceeds to step S50.

Description of the Related Art

In step S50, engine braking power Pmf (Pmf2 to Pmf5) of the front motor 3 of each shift range (B0 to B5) is computed. The engine braking power Pmf of each shift range, which is regenerative power generated from the front motor 3 while the deceleration torque Tm is generated, is computed based on the deceleration torque Tm of each shift range computed in step S40, the vehicle speed V computed in step S30, and a front-wheel distribution ratio Rdf. The front-wheel distribution ratio Rdf may be constant for example at 0.5, or may be changed based on a vehicle acceleration and a steering angle inputted from the G sensor 26 and the steering angle sensor 27. The deceleration torque Tmf of the front motor 3 is computed by multiplying the deceleration torque Tm by the front-wheel distribution ratio Rdf, and the regenerative power generated from the front motor 3 when the deceleration torque Tmf is generated is the engine braking power Pmf. Moreover, the engine braking power Pmf is set so as to be decreased as the vehicle speed V decreases. Deceleration force is set such that the B2 range selected by the paddle switch 31 and the D range selected by the lever obtain the same or a similar level of deceleration force. Then, the process proceeds to step S60.

Regenerative braking allows generated power to be charged to an on-board battery, and can also brake the vehicle just as engine braking.

Moreover, among vehicles which are capable of regenerative braking, there is known a vehicle in which the driver can change regenerative braking torque (regenerative braking force). For example, there has been developed a vehicle in which the regenerative braking torque can be switchable in several stages with a shift switch provided in a steering wheel, etc.

Further, there has been proposed a vehicle which is equipped with a transformer for stepping up and down voltage, and steps up the voltage outputted from an on-board battery with the transformer to drive the electric motor.

For example, Japanese Patent Laid-Open No. 2007-325352 discloses a vehicle including an electrically powered front motor for driving the front wheels and a rear motor for driving the rear wheels. In the concerned vehicle, the front motor is driven by voltage which is outputted from an on-board battery and stepped up by a transformer. Power generated by a generator can be supplied to the front motor. Further, stepping down the power generated by the generator with the transformer enables power supply to the rear motor and charging of the battery.

However, there are upper limits for input and output power for the transformer as described above for protecting components from generated heat or the like. Therefore, in a vehicle as described above which includes a transformer and is capable of regenerative braking, a problem exists in that when power generated from the front motor increases due to regenerative braking during deceleration, there is a case in which regenerative braking torque of the front motor must be limited and thus braking force is decreased, which causes mismatching with the driver's operation to select regenerative braking torque and gives an uncomfortable feeling to the driver.

SUMMARY OF THE INVENTION

Accordingly, it is an objective of the present invention to provide a travel driving apparatus for a vehicle, which ensures minimum necessary regenerative braking force during deceleration of the vehicle, and enables deceleration without an uncomfortable feeling against driver's operation to set regenerative braking force.

In order to achieve the above described objective, the travel driving apparatus for a vehicle of the present invention includes: an electrical motor which regenerates power by rotating force of a driving wheel of a vehicle and exerts regenerative braking force; a battery mounted on the vehicle; a transformer for transforming the power regenerated by the electrical motor and supplying the power to the battery, wherein maximum input/output power is limited based on a temperature condition; a regenerative braking force selecting section for setting a magnitude of regenerative braking force in such a way to be changed stepwisely; and a regenerative braking force computing section for decreasing the regenerative braking force to be less than regenerative braking force when the transformer is not limited, when a selection stage in which regenerative braking force increases more than in a predetermined selection stage is selected by the regenerative braking force selecting section while the transformer is limited.

This makes it possible to protect the transformer while ensuring minimally required drivability by causing a minimum level of regenerative force to be exerted even while the transformer is limited.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, embodiments of the present invention will be described with reference to the drawings.

Figure 1:
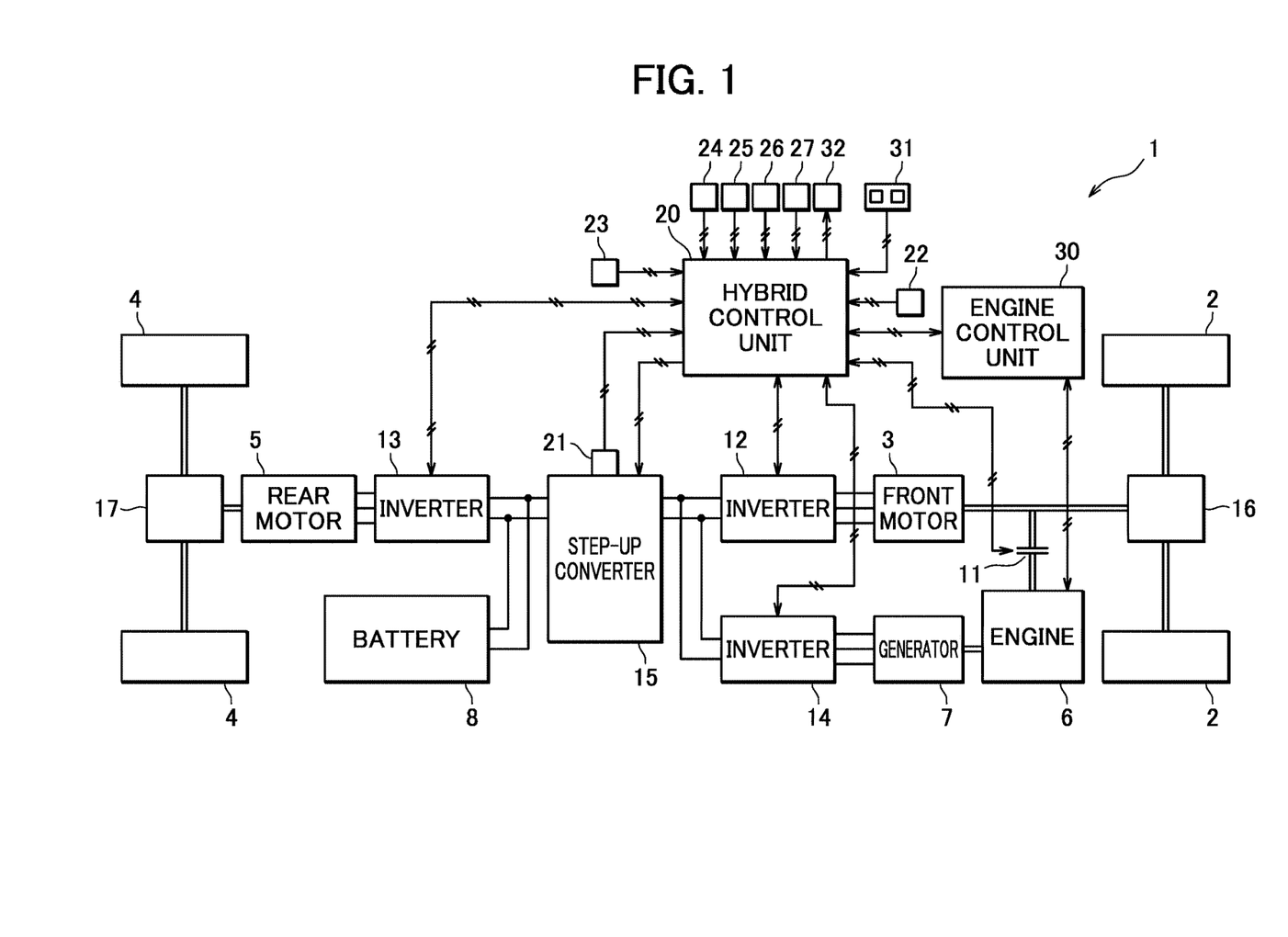
FIG. 1 is a schematic configuration diagram of a travel driving apparatus of a vehicle according to one embodiment of the present invention.

FIG. 1 is a schematic configuration diagram of a travel driving apparatus 1 of a vehicle according to one embodiment of the present invention.

As shown in FIG. 1, a vehicle equipped with the travel driving apparatus 1 of one embodiment of the present invention is a four-wheel drive hybrid vehicle including: an electrically driven front motor 3 (electrical motor) for driving front wheels 2 (travel driving wheels), an electrically driven rear motor 5 for driving rear wheels 4, an engine 6 (internal combustion engine), a generator 7, and a battery 8.

The engine 6 can drive the front wheels 2 via a front trans-axle 16 and drive the generator 7 to generate power. Moreover, the engine 6 and the front wheels 2 are connected such that power can be transferred therebetween via a clutch 11.

Moreover, the vehicle is provided with an inverter 12 for controlling power supply to the front motor 3, an inverter 13 for controlling power supply to the rear motor 5, and an inverter 14 for controlling output of the generator 7.

The present embodiment includes a step-up converter 15 (transformer) which steps up the voltage of the battery 8 and supplies high voltage power to the front motor 3, and at the same time steps down the high voltage power generated by the generator 7 to supply it to the battery 8 and the rear motor 5.

The front motor 3, which can be driven by being supplied with power from the battery 8 via the step-up converter 15 and the inverter 12, and also can be driven by being supplied with power from the generator 7 via the inverter 14 and the inverter 12, drives the front wheels 2 via the front trans-axle 16.

The rear motor 5, which is driven by being supplied with power from the battery 8 via the inverter 13, and also can be driven by being supplied with power from the generator 7 via the inverter 14, a step-up converter 15, and the inverter 13, drives the rear wheel 4 via a rear trans-axle 17.

The power generated by the generator 7 and outputted from the inverter 14 allows charging of the battery 8 via the step-up converter 15, and can also be supplied to the front motor 3 via the inverter 12 and to the rear motor 5 via a step-up converter 15, and the inverter 13.

Moreover, the generator 7, which is driven by being supplied with power from the battery 8 via the step-up converter 15 and the inverter 14, has a function as a starter motor for starting the engine 6.

The battery 8, which is made up of a secondary cell battery such as a lithium-ion battery, has a battery module not shown and made up of a plurality of battery cells brought together.

Operation of each of the inverter 12, the inverter 13, and the inverter 14 is controlled by a control signal from a hybrid control unit 20 (regenerative braking force computing section and a generator computing section) mounted on the vehicle.

The step-up converter 15 is provided with a temperature sensor 21 for detecting the temperature of a component (element, etc.) of the step-up converter 15. Moreover, a lever for selecting a travelling mode of the vehicle is provided in a driver's seat. This lever allows selection of travelling modes of vehicle such as a D range (travelling range), an N range, and the like. Moreover, a paddle switch 31 (regenerative braking force selecting section) for performing speed-change operation, which includes a shift-up switch and a shift-down switch, is provided in a steering wheel of the vehicle. The paddle switch 31 can switch over the regenerative braking torque (deceleration torque Tm) during deceleration of the vehicle by selecting from 6-stage shift ranges of B0 to B5. Here, the deceleration torque may be represented as engine braking torque. B0 indicates 0 or a small value of regenerative braking torque, and the regenerative braking torque increases in the order from B1 to B2, B3, B4, and B5. B2 is a D range in which a braking torque equivalent to engine braking of an engine driven vehicle is applied, and which corresponds to a predetermined selection stage in the present invention.

Moreover, the vehicle is equipped with a front-wheel rotational frequency sensor 22 for detecting the number of rotations per unit time of the front wheel 2, a rear-wheel rotational frequency sensor 23 for detecting the number of rotations per unit time of the rear wheel 4, an accelerator sensor 24 for detecting an accelerator depression amount, a brake sensor 25 for detecting a brake depression amount, a G sensor 26 for detecting longitudinal acceleration and lateral acceleration of the vehicle, a steering angle sensor 27 for detecting a steering control angle (steering angle), an engine control unit 30 for controlling driving of the engine 6, and a notification section 32 for notifying the driver of the shift range selected by the paddle switch 31 and incapability of selecting the shift range.

The engine control unit 30 controls the driving of the engine 6 based on a control signal from the hybrid control unit 20.

The hybrid control unit 20, which is a control apparatus for performing comprehensive control of the vehicle, is configured to include an input/output apparatus, a storage apparatus (ROM, RAM, non-volatile RAM, etc.), a central processing unit (CPU), and a timer, etc.

The input side of the hybrid control unit 20 is connected with each of the inverters 12 to 14, the engine control unit 30, the temperature sensor 21, the front-wheel rotational frequency sensor 22, the rear-wheel rotational frequency sensor 23, the accelerator sensor 24, the brake sensor 25, the G sensor 26, the steering angle sensor 27, and the paddle switch 31, and is inputted with detection and operation information from these equipment.

On the other hand, the output side of the hybrid control unit 20 is connected with each of the inverters 12 to 14, the step-up converter 15, the engine control unit 30, and the clutch 11.

Then, the hybrid control unit 20 transmits a control signal to the engine control unit 30, each of the inverters 13 and 14, the step-up converter 15, and the clutch 11 to control the switching of the traveling mode (EV mode, series mode, and parallel mode) which involves engagement and disengagement of the clutch 11, output torques of the engine 6, the front motor 3 and the rear motor 5, and generated power of the generator 7 based on various detection amounts such as accelerator depression amount from the accelerator sensor 24 of the vehicle, and various operation information.

In the parallel mode, the front wheels 2 are mechanically driven by the output of the engine 6 with the clutch 11 being engaged, and driving of the vehicle is assisted by the front motor 3 or the rear motor 5.

In the EV mode and the series mode, the clutch 11 is disengaged. In the EV mode, the engine 6 is stopped, and the front motor 3 and the rear motor 5 are driven by power from the battery 8. In the series mode, the engine 6 is operated to cause the generator 7 to generate power, thereby supplying power to and driving the front motor 3 and the rear motor 5.

Moreover, the vehicle of the present embodiment is configured to be capable of regenerative braking in which the front motor 3 and the rear motor 5 are regeneratively driven to generate power as well as to apply braking force to the front wheels 2 and the rear wheels 4 during deceleration of the vehicle. The hybrid control unit 20 has a function of controlling power amount generated through the regenerative driving of the front motor 3 and the rear motor 5 respectively via the inverter 12, 13 during deceleration of the vehicle, thereby independently controlling the regenerative braking forces (regenerative braking torques) of the front wheels 2 and the rear wheels 4.

Figure 2:
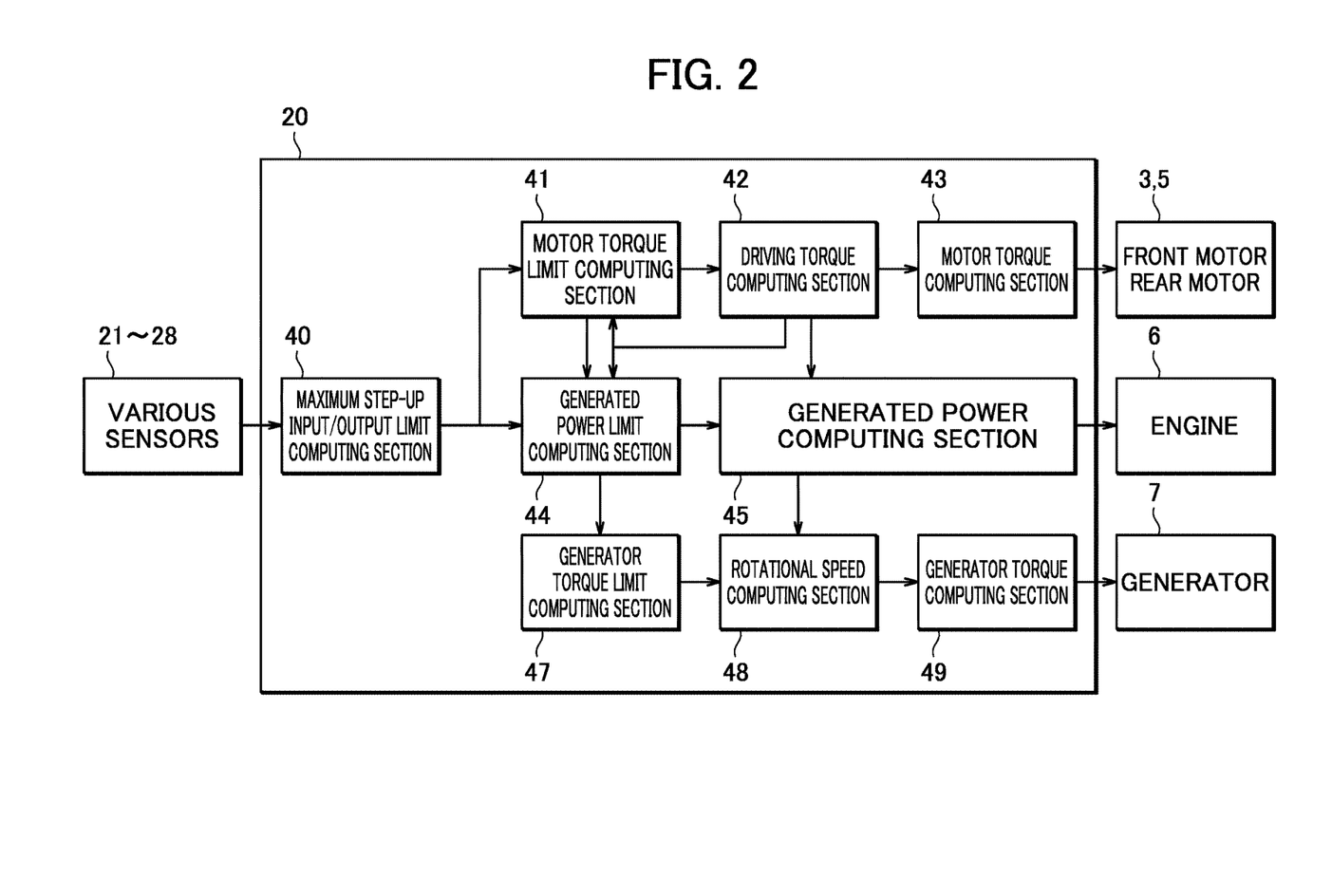
FIG. 2 is a block diagram to show the configuration of a drive control apparatus according to the present embodiment.

FIG. 2 is a block diagram to show the configuration of a driving control apparatus of the present embodiment.

As shown in FIG. 2, the hybrid control unit 20 includes a maximum step-up input/output limit computing section 40, a motor torque limit computing section 41, a driving torque computing section 42, a motor torque computing section (regenerative braking force computing section) 43, a generated power limit computing section 44, a generated power computing section 45, a generator torque limit computing section 47, a rotational speed computing section 48, and a generator torque computing section 49.

The maximum step-up input/output limit computing section 40 computes a step-up converter upper-limit power Pvmax, which is a maximum input/output power of the step-up converter 15, based on the temperature of the step-up converter 15.

The motor torque limit computing section 41 computes motor maximum torques, which are upper limit values of the motor torques (power torques and regenerative torques of the front motor 3 and the rear motor 5), respectively.

The driving torque computing section 42 computes driving torque of the entire vehicle (user-requested driving torque Tur).

The motor torque computing section 43 computes motor torques Tmf, Tmr of the front motor 3 and the rear motor 5. Then, based on these motor torques Tmf, Tmr, it controls the operation of the front motor 3 and the rear motor 5 via the inverters 12, 13.

The generated power limit computing section 44 computes a maximum value of the generated power of the generator 7.

The generated power computing section 45 computes the generator output Pg, which is generated power by the generator 7, which is required corresponding to the user-requested driving torque Tur. Then, the operation of the engine 6 is controlled via the engine control unit 30 such that power generation of the generator output Pg becomes possible in the generator 7.

The generator torque limit computing section 47 computes a maximum value of the generator torque (on the side of regeneration).

The rotational speed computing section 48 computes a rotational speed of the generator 7 corresponding to the generator output Pg.

The generator torque computing section 49 computes a generator torque for achieving the rotational speed of the generator 7 which is computed at the rotational speed computing section 48. Then, based on the generator torque, it controls the generator 7 via the inverter 14.

Next, driving control by the travel driving apparatus 1 of the present embodiment will be described in detail by using FIGS. 3 and 4.

FIG. 3 is the flowchart to show the driving control procedure in the travel driving apparatus 1. FIG. 4 is an explanatory diagram to show a set condition of selectable ranges. Note that a solid line in FIG. 4 indicates step-up converter upper-limit power Pvmax, and a broken line indicates deceleration power (engine braking power) Pmf.

The hybrid control unit 20 repeatedly executes routines of driving control shown in FIG. 3 in the series mode.

First, in step S10, a temperature of the step-up converter 15 is inputted from the temperature sensor 21. Then the process proceeds to step S20.

In step S20, a step-up converter upper-limit power Pvmax is computed based on the temperature of the step-up converter 15 which has been inputted in step S10. The step-up converter upper-limit power Pvmax is a maximum value of power which can be inputted/outputted in the step-up converter 15. The step-up converter upper-limit power Pvmax is computed, for example, by using a prestored map and is set as shown by the solid line of FIG. 4 such that the step-up converter upper-limit power Pvmax decreases as the temperature of the step-up converter 15 increases. Then, the process proceeds to step S30. Note that the control of this step corresponds to the function in the above described maximum step-up input/output limit computing section 40.

In step S30, the vehicle speed V is computed from the rotational frequency of the front wheel 2 (front-wheel rotational frequency Rf), which is detected by the front-wheel rotational frequency sensor 22 or the front motor rotational frequency sensor (resolver), and the rotational frequency of the rear wheel 4 (rear-wheel rotational frequency Rr), which is detected by the rear-wheel rotational frequency sensor 23 or the rear motor rotational frequency sensor (resolver). The vehicle speed V may be found from, for example, an average value of the front wheel rotational frequency Rf and the rear wheel rotational frequency Rr. Then, the process proceeds to step S40.

In step S40, a deceleration torque Tm of each shift range selected by the paddle switch 31 is computed. The deceleration torque Tm is a braking torque during regenerative braking, which is preset in each shift range. Note that in the present embodiment, deceleration torques Tm (Tm2 to Tm5) of B3 range or higher (B3 to B5) are limited according to a temperature condition of the step-up converter. The deceleration torque Tm is set so as to be small in B0 range and largest in B5 range within an extent from B0 range to B5 range. Then, the process proceeds to step S50.

In step S50, engine braking power Pmf (Pmf2 to Pmf5) of the front motor 3 of each shift range (B0 to B5) is computed. The engine braking power Pmf of each shift range, which is regenerative power generated from the front motor 3 while the deceleration torque Tm is generated, is computed based on the deceleration torque Tm of each shift range computed in step S40, the vehicle speed V computed in step S30, and a front-wheel distribution ratio Rdf. The front-wheel distribution ratio Rdf may be constant for example at 0.5, or may be changed based on a vehicle acceleration and a steering angle inputted from the G sensor 26 and the steering angle sensor 27. The deceleration torque Tmf of the front motor 3 is computed by multiplying the deceleration torque Tm by the front-wheel distribution ratio Rdf, and the regenerative power generated from the front motor 3 when the deceleration torque Tmf is generated is supposed to be the engine braking power Pmf. Moreover, the engine braking power Pmf is set so as to be decreased as the vehicle speed V decreases. Deceleration force is set such that the B2 range selected by the paddle switch 31 and the D range selected by the lever obtain the same or a similar level of deceleration force. Then, the process proceeds to step S60.

In step S60, switching of engine braking power is performed. Specifically, the engine braking power Pmf (Pmf2 to Pmf5) of each shift range is set within a range lower than the step-up converter upper-limit power Pvmax computed in step S20. Then, after the engine braking power Pmf (Pmf2 to Pmf5) of each shift range is calculated, the generator output Pg (predetermined generated power), which is reserve power of the generator, is calculated by subtracting the engine braking power Pmf (Pmf2 to Pmf5) of each shift range from the step-up converter upper-limit power Pvmax.

Figure 4:
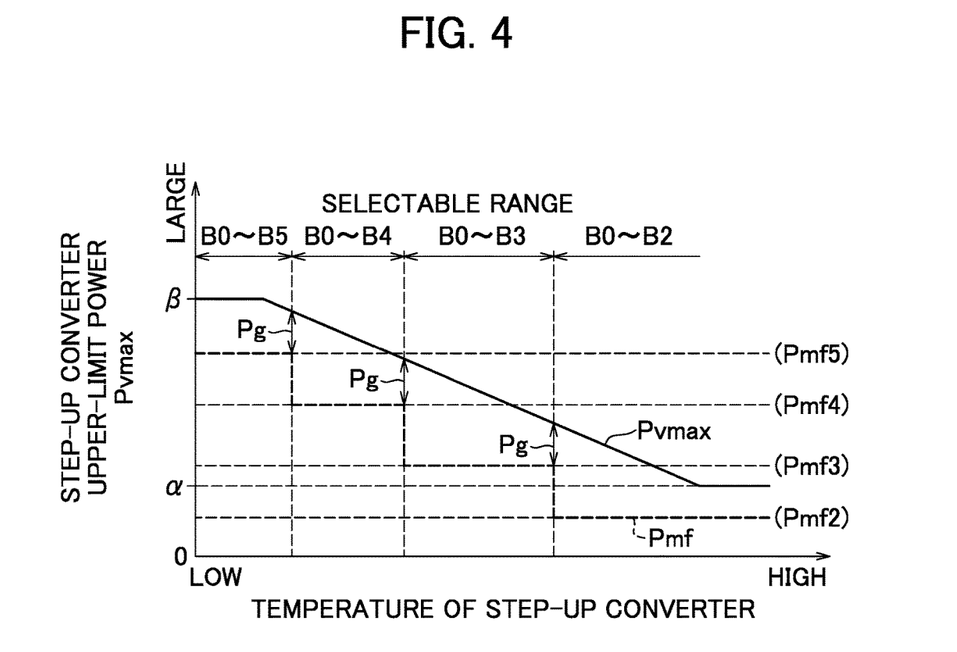
FIG. 4 is an explanatory diagram to show a set condition of selectable ranges.

As shown in FIG. 4, with respect to a value obtained by subtracting the generator output Pg from the step-up converter upper-limit power Pmvax, which decreases as the temperature of the step-up converter 15 increases, the largest value among Pmf2 to Pmf5 is selected as the engine braking power Pmf. Then, an extent between the shift range of the selected engine braking power Pmf and B0 will become a selectable range. Therefore, as shown in FIG. 4, as the temperature of the step-up converter 15 increases, shift ranges become unselectable stepwisely in the order from a shift range (B5) having a larger regenerative braking torque, that is, it becomes necessary to decrease regenerative force which can be generated at a normal temperature of the step-up converter 15. However, regenerative driving force is preset so as to be reliably exerted to ensure a minimum level of deceleration force from B0 to B2. As a result of that, there is no need of limiting the regenerative braking force in from B0 to B2, and it is possible to achieve the feeling of deceleration desired by the driver. Then, the process proceeds to S70.

In step S70, the selectable range selected in step S60 is displayed by for example an indicator provided at a driver's seat of the vehicle. Moreover, when the shift range currently selected by the paddle switch 31 is beyond a selectable range, notification may be made by the notification section 32 such as an alarm lamp, a buzzer, or the like. Alternatively, when the shift range is beyond the selectable range, the regenerative braking torque may be restricted without making notification, and when the driver operates the paddle switch 31 again, notification may be made. Then, the process proceeds to step S80.

In step S80, the generator output Pg is limited. The generator output Pg is limited so as to be not more than a value obtained by subtracting the engine braking power Pmf from the step-up converter upper-limit power Pvmax computed in step S20. Then, the main routine is ended.

The vehicle of the present embodiment is a four-wheel driving vehicle in which the front wheels 2 can be driven by the front motor 3, and the rear wheels 4 can be driven by the rear motor 5, and which is capable of regenerative braking by the front motor 3 and the rear motor 5 during deceleration. Then, the hybrid control unit 20 can control the regenerative braking torques via the inverters 12, 13, respectively.

Moreover, the vehicle according to the present embodiment can operate in a series mode in which power is generated by operating the engine 6, and travel driving is performed by the front motor 3 and the rear motor 5.

The vehicle is mounted with the step-up converter 15 and is configured such that the front motor 3 is supplied with and driven by power which is supplied from the battery 8 and is stepped up in voltage by the step-up converter 15. During deceleration of the vehicle, generated power by the generator 7 and regenerative power (engine braking power Pmf) by the front motor 3 are passed through the step-up converter 15 to be supplied to and charge the battery 8.

In the present embodiment, by selecting a shift range with the paddle switch 31, it is made possible to switch over the regenerative braking torque during deceleration of the vehicle in several stages. Then, since the selectable range by the paddle switch 31 is limited according to the step-up converter upper-limit power Pvmax, and thereby the engine braking power Pmf is limited, it is possible to suppress the input power of the step-up converter 15, thereby protecting the step-up converter 15.

Note that, in the series mode, although the driving torque by the front motor 3 and the rear motor 5 become unnecessary during deceleration of the vehicle, it is possible to charge the battery 8 by driving the engine 6 to generate power. Therefore, during deceleration of the vehicle in the series mode, there is a case in which not only the engine braking power Pmf but also the generator output Pg by the generator 7 are generated, and these power is inputted together into the step-up converter 15.

Thus, in the present embodiment, since selectable range of the shift range is set so as to be able to obtain as large engine braking power Pmf as possible while ensuring that a total value of the generator output Pg by the generator 7 and the engine braking power Pmf by the front motor 3 is not more than the step-up converter upper-limit power Pvmax, it becomes possible to select as large regenerative braking torque as possible according to a temperature condition of the step-up converter 15. As for the selectable range of the shift range, since at least B2 (D) range is selectable, it is possible to ensure a regenerative braking torque equivalent to engine braking which can be exerted in a conventional engine-equipped vehicle, thereby ensuring vehicle deceleration performance.

Moreover, the engine braking power Pmf changes according to the vehicle speed and, at lower vehicle speeds, the selectable shift range will be expanded since the engine braking power Pmf decreases. Therefore, it is possible to select a wider shift range according to vehicle speeds, thus ensuring larger regenerative braking torques.

Moreover, when the selectable range of the shift range is limited based on the step-up converter upper-limit power Pvmax, since if the regenerative braking does not match the operation of the paddle switch 31 by the driver, an alarm is given to the driver with a display and an alarming light, it is possible to notify the driver that the regenerative braking is limited.

Note that although the generator output Pg is set as constant in the above described embodiment, it may be controlled to be changed based on, for example, a charging rate of the battery 8. When the charging rate is decreased, it is possible to facilitate charging of the battery 8 by setting the generated power of the generator 7 to be larger. When the charging rate is close to a full charge, it is possible to set the engine braking power Pmf to be still larger by setting the generated power of the generator 7 to be smaller, thereby further increasing the regenerative braking torque.

Note that the present invention will not be limited to the above described embodiments. The present invention is widely applicable to hybrid vehicles which are equipped with a step-up converter to perform regenerative braking.

What is claimed is:

1. A travel driving apparatus for a vehicle, comprising:
   an electrical motor which regenerates power by use of rotating force of a driving wheel of the vehicle, and exerts regenerative braking force;
   a battery mounted on the vehicle;
   a transformer for transforming the power regenerated by the electrical motor and supplying the power to the battery, wherein maximum input/output power is limited based on a temperature condition of the transformer;
   a regenerative braking force selector allowing a driver of the vehicle to select a magnitude of regenerative braking force in a stepwise manner; and a processor and a storage storing a program that causes the processor to:

decrease the regenerative braking force to be exerted by the electrical motor to be less than regenerative braking force compared to when the maximum input/output power of the transformer is not limited, when a selection stage in which regenerative braking force increases more than in a predetermined selection stage is selected by the regenerative braking force selector while the maximum input/output power of the transformer is limited due to the temperature condition of the transformer, and control the electrical motor to exert the decreased regenerative braking force in accordance with the selection stage selected by the regenerative braking force selector.

2. The travel driving apparatus for the vehicle according to claim 1, wherein the program further causes the processor to:

adjust the regenerative braking force exerted by the electrical motor to be the same as a regenerative braking force at a normal time when the predetermined selection stage, or a selection stage in which regenerative braking force decreases to be less than in the predetermined selection stage, is selected by the regenerative braking force selector even while the transformer is limited, and control the electrical motor to exert the adjusted regenerative braking force.

3. The travel driving apparatus for the vehicle according to claim 1, wherein the predetermined selection stage exerts the same regenerative braking force as that in a travelling range of the vehicle.

4. The travel driving apparatus for the vehicle according to claim 2, wherein the predetermined selection stage exerts the same regenerative braking force as that in a travelling range of the vehicle.

5. The travel driving apparatus for the vehicle according to claim 1, further comprising:

a notifier notifying an occupant of the vehicle when a selection stage in which regenerative braking force increases to be more than in the predetermined selection stage is selected by the regenerative braking force selector while the transformer is limited.

6. The travel driving apparatus for the vehicle according to claim 2, further comprising:

a notifier notifying an occupant of the vehicle when a selection stage in which regenerative braking force increases to be more than in the predetermined selection stage is selected by the regenerative braking force selector while the transformer is limited.

7. The travel driving apparatus for the vehicle according to claim 3, further comprising:

a notifier notifying an occupant of the vehicle when a selection stage in which regenerative braking force increases to be more than in the predetermined selection stage is selected by the regenerative braking force selector while the transformer is limited.

8. The travel driving apparatus for the vehicle according to claim 1, further comprising:

an internal combustion engine mounted on the vehicle; and a generator for generating power by being driven by the internal combustion engine, transforming the power with the transformer, and supplying the power to the battery or the electrical motor, wherein the program further causes the processor to:

compute a generated power of the generator, and set a value obtained by subtracting regenerated power exerted in a selection stage selected by the regenerative braking force selector from maximum input/output power of the transformer to be a maximum value of the generated power.

9. The travel driving apparatus for the vehicle according to claim 2, further comprising:

an internal combustion engine mounted on the vehicle; and a generator for generating power by being driven by internal combustion engine, transforming the power with the transformer, and supplying the power to the battery or the electrical motor, wherein the program further causes the processor to:

compute generated power of the generator, and set a value obtained by subtracting regenerated power exerted in a selection stage selected by the regenerative braking force selector from maximum input/output power of the transformer to be a maximum value of the generated power.

10. The travel driving apparatus for the vehicle according to claim 3, further comprising:

an internal combustion engine mounted on the vehicle; and a generator for generating power by being driven by internal combustion engine, transforming the power with the transformer, and supplying the power to the battery or the electrical motor, wherein the program further causes the processor to:

compute generated power of the generator, and set a value obtained by subtracting regenerated power exerted in a selection stage selected by the regenerative braking force selector from maximum input/output power of the transformer to be a maximum value of the generated power.

11. The travel driving apparatus for the vehicle according to claim 4, further comprising:

an internal combustion engine mounted on the vehicle; and a generator for generating power by being driven by internal combustion engine, transforming the power with the transformer, and supplying the power to the battery or the electrical motor, wherein the program further causes the processor to:

compute generated power of the generator, and set a value obtained by subtracting regenerated power exerted in a selection stage selected by the regenerative braking force selector from maximum input/output power of the transformer to be a maximum value of the generated power.

12. The travel driving apparatus for a vehicle according to claim 5, further comprising:

an internal combustion engine mounted on the vehicle; and a generator for generating power by being driven by internal combustion engine, transforming the power with the transformer, and supplying the power to the battery or the electrical motor, wherein;

the program further causes the processor to:

compute generated power of the generator, and set a value obtained by subtracting regenerated power exerted in a selection stage selected by the regenerative braking force selector from maximum input/output power of the transformer to be a maximum value of the generated power.

13. The travel driving apparatus for the vehicle according to claim 6, further comprising:
an internal combustion engine mounted on the vehicle; and
a generator for generating power by being driven by internal combustion engine, transforming the power with the transformer, and supplying the power to the battery or the electrical motor, wherein
the program further causes the processor to:
compute generated power of the generator, and
set a value obtained by subtracting regenerated power exerted in a selection stage selected by the regenerative braking force selector from maximum input/output power of the transformer to be a maximum value of the generated power.

14. The travel driving apparatus for the vehicle according to claim 7, further comprising:
an internal combustion engine mounted on the vehicle; and
a generator for generating power by being driven by internal combustion engine, transforming the power with the transformer, and supplying the power to the battery or the electrical motor, wherein
the program further causes the processor to:
compute generated power of the generator, and
set a value obtained by subtracting regenerated power exerted in a selection stage selected by the regenerative braking force selector from maximum input/output power of the transformer to be a maximum value of the generated power.

* * * * *